United States Patent Office 3,527,570
Patented Sept. 8, 1970

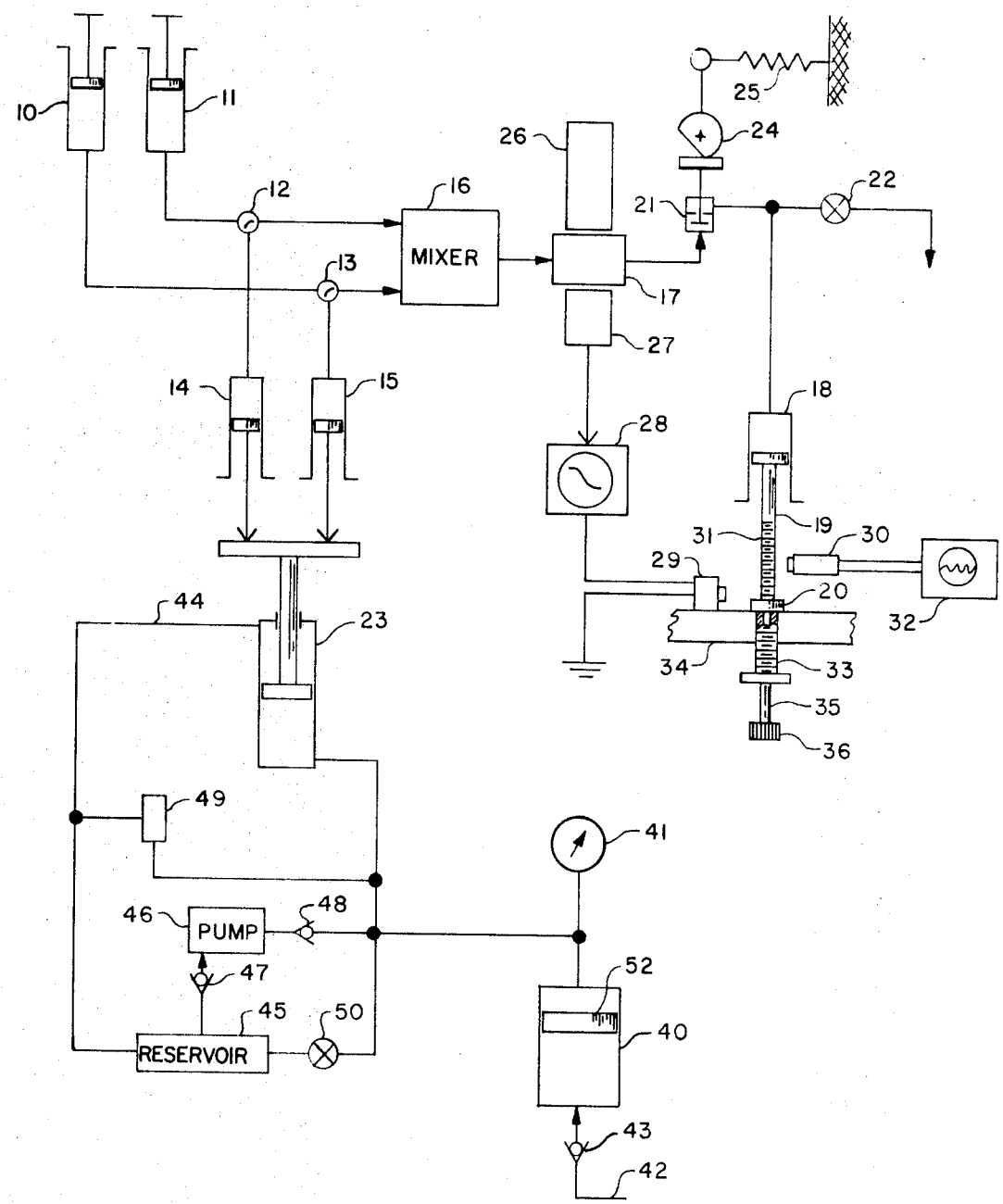

3,527,570
STOPPED FLOW REACTION KINETIC SYSTEM
Harry A. Penhasi, Cupertino, Calif., assignor to Beckman Instruments, Inc., a corporation of California
Filed Feb. 19, 1968, Ser. No. 706,351
Int. Cl. G01n 21/24
U.S. Cl. 23—253                                            7 Claims

ABSTRACT OF THE DISCLOSURE

A stopped flow reaction kinetic system employing a hydro-pneumatic drive against reaction drive cylinders for forcing reactants stored therein under substantially uniform pressure through a mixer the outlet port of which is connected to an observation cell. An outlet port of said cell is connected through a normally closed valve to a stopping cylinder. Upon the valve being opened, reactants from the drive cylinders flow through the mixer and cell until the piston of the stopping cylinder is forced against a preset stop. In that manner, the system remains pressurized at all times at a substantially uniform level.

BACKGROUND OF INVENTION

Field of invention

This invention relates to a stopped flow module and drive system and more particularly to a stopped flow reaction kinetic system in which fluid pressures remain substantially constant while mixing the reactants and filling the observation cell.

Description of the prior art

Stopped flow apparatus for kinetic experiments have been devised in the past and described in the literature. One such apparatus is described by Q. H. Gibson and L. Milnes in the Biochemical Journal, vol. 91 (1964) at pages 161 to 171. Another apparatus is described by Philipp Strittmatter in Rapid Mixing and Sampling Techniques in Biochemistry, edited by Britton Chance et al., Academic Press (1964) at pages 71 to 85. In such prior art apparatus, the reactants, or reagents, are transferred from reservoir syringes to driving syringes where they are stored under atmospheric pressure until rapid mixing is desired for a kinetic determination, at which time plungers of the drive syringes are manually forced in simultaneously. In that manner, pressure is increased relatively uniformly in both drive syringes. Rapid flow of the reactants through a mixer quickly fills an observation cell until a piston is driven by the mixed reactants against a preset stop at which time pressure in the system, and more particularly in the observation cell, drops to atmospheric pressure thereby establishing pressure waves in the observation cell. These pressure waves cause significant disturbances in the kinetic determination at a critical time, which is when the flow of the mixed reactants is stopped in the cell for observation. For best kinetic determination, it is desirable to make the observation of the mixed reactants immediately after mixing, and in order to make the observation of the kinetic reaction, the mixed reactants should be stopped in the observation cell.

A further deficiency of the prior art stopped flow and drive systems for kinetic determinations is that reactants must be degassed for otherwise gases given off may enter the observation cell in the form of gas bubbles and thereby introduce error in the kinetic determination. This deficiency is compounded by cavitation which may occur, depending upon the design of the system, as the direction of flow changes. Since it is difficult, if not impossible, to design a system with straight-line flow from the reactant syringes through a mixer into the observation cell, cavitation is a significant problem particularly if the reactants have not been degassed since gases will tend to rapidly fill cavities and not be immediately re-absorbed by the mixed reactants.

Still another deficiency of the prior art systems is that it is difficult to repeat kinetic determination runs with consistency since sources of error inherent in the system will vary in magnitude as the manner in which the reactant syringes are driven.

SUMMARY OF INVENTION

Problems of the prior art are overcome in apparatus for rapidly filling an observation cell with reactants where such apparatus includes a plurality of hydraulic reactant drive cylinders for driving predetermined quantities of reactants through a mixer into an observation cell until mixed reactants flowing therethrough force a piston of a stopping cylinder against a preset stop by providing a valve shutting off the flow of mixed reactants to the stopping cylinder until the kinetic determination is to be made and pressurizing the reactants in the drive cylinders with a hydropneumatic drive system. To initiate a kinetic determination of the reactants, the valve is simply opened thereby allowing the reactants under pressure to flow through the mixer and observation cell or cuvette into the stopping cylinder until the piston thereof is forced against the preset stop. In that manner, the system remains at a substantially uniform pressure at all times. To reset the system, the valve is closed, and the piston of the stopping cylinder reset to its initial relative position away from the preset stop. To repeat the run the aforementioned valve is simply reopened immediately or, as desired, following the reset operation. A rapid succession of repeatable runs are thus achieved, until such time as the reactant cylinders are emptied. The reactant cylinders are then reloaded through outlet ports thereof. The number of runs achieved per charge of reactant cylinders is dependent on the size of reactant cylinders and the amount of reactants used per run as determined by the stopping cylinder setting. As the pistons of the reactant cylinders are forced back upon being reloaded, the hydropneumatic drive system comprising a hydraulic power cylinder is automatically reset since hydraulic fluid for the power cylinder is driven back into an accumulator as the reactant cylinders are reloaded. The accumulator is then recharged with a gas in a space the volume of which is so large relative to the total volume of the fully expanded power cylinder that pressure is maintained substantially constant in the apparatus as reactants are driven through the mixer and the observation cell into the stopping cylinder for more than one successive kinetic determination run. A magnetic rate transducer senses a number of equally spaced, circular ridges machined on the arm or plunger of the stopping cylinder piston in order to derive a signal displacement of the stopping cylinder piston, and the rate of such displacement in order that mean dead time, mixing time and sample volume used may, as desired, be determined.

An object of this invention is to provide an improved stopped flow module and drive system for kinetic determinations which provides repeatable results.

Still another object of this invention is to provide a stopped flow module and drive system which does not require degassing reactants before a kinetic determination of the mixture thereof is made.

Yet another object of this invention is to provide a stopped flow module and drive system for rapid, successive kinetic determinations.

And yet another object is to provide a stopped flow module employing a transducer for obtaining a signal from which mean dead time, mixing time and sample volume used may be determined as desired.

Other objects and advantages will become apparent from the following description with reference to the drawing.

BRIEF DESCRIPTION OF DRAWING

The sole figure of the drawing is a schematic diagram of a stopped flow module and drive system for kinetic determination including a hydropneumatic drive system and a magnetic rate transducer associated with a stopping cylinder.

DESCRIPTION OF PREFERRED EMBODIMENT

Referring now to the drawing, the reactants are placed in storage syringes or cylinders 10 and 11 from which they are transferred by proper setting of valves 12 and 13 to reactant drive cylinders 14 and 15. However, before doing so, or before making an actual kinetic determination by driving the reactants from the driving cylinders through a mixer 16 to an observation cell or cuvette 17, a stopping cylinder 18 is reset with its piston arm or plunger 19 a preset distance away from a stop 20 with a trigger valve 21 closed and a drain valve 22 open during resetting and closed thereafter. Alternatively, the stop 20 may be set a preset distance from the plunger 19 by means not shown if the plunger is reset up into the cylinder 18 clear to the top thereof as viewed in the drawing. A hydropneumatic drive comprising basically a hydraulic power cylinder 23 and accumulator 40 is provided to maintain a substantially constant pressure on the stopped flow module and drive system once it is charged with reactants in the reactant driving cylinders 14 and 15 and the valves 12 and 13 are set for connecting the reactant drive cylinders to the mixer 16.

To initiate a kinetic determination, the trigger valve 21 is abruptly opened by rotation of a cam 24 to the position shown either manually, or through a spring 25 with a suitable trigger mechanism not shown such that the force of the spring which is manually preset will be transferred to the cam 24 to actuate it only when released by the trigger mechanism. The constant pressure provided by the hydropneumatic drive system forces the pistons of the reactant driving cylinders 14 and 15 inwardly to transfer reactants to the observation cell 17 through the mixer 16 once the trigger valve 21 has been opened.

The observation cell 17 is placed as close to the mixer 16 as possible in order that the kinetic determination of the mixed reactants may be made by observing the transmittance of light therethrough from a monochromatic light source 26 to a photomultiplier 27, within the shortest possible time. Changes in transmittance, or optical density of the mixed reactants in the observation cell, are read out of the photomultiplier through an oscilloscope 28 or other recorder not shown.

A suitable arrangement for a monochromatic light source 26, observation cell 17, photomultiplier 27 and oscilloscope 28 is disclosed in a copending application Ser. No. 631,061 filed Apr. 14, 1967, and assigned to the assignee of the present invention.

A microphone 29, or other trigger mechanism, senses the moment the stopping cylinder piston arm 19 reaches the preset stop 20 to provide a trigger signal for synchronizing the oscilloscope sweep with the precise instant that the flow of mixed reactants is stopped in the observation cell 17. A magnetic transducer 30 is provided to sense the number of equally spaced, magnetically permeable circular ridges 31 machined on the end of the stopping cylinder arm 19. Such a transducer may be of the type commonly referred to as a variable reluctance transducer or electromagnetic pickup. Various commercial models are sold by Electro Products Laboratories, Inc., of Chicago, Ill. The signal obtained from the transducer 32 as successive ridges 31 move past it is a sine wave with varying frequency and amplitude, both a function of velocity. That signal may be displayed on an oscilloscope 32 in order to determine, in an indirect way, the mean dead time, mixing time and volume of reactants used. Alternatively, the signal may be applied to a computer for automatically making such determinations. Since the frequency and amplitude is a function of velocity, the quantity of reactants used is determined directly as by integration.

The dead time is defined as the finite time interval elapsed, for given infinitesimal quantities of reactants, from the instant the reactants have met to the instant the same reactants (now mixed) appear within the observation cell and are visible. This time interval is denominated dead time because the reaction which takes place in the mixture of the infinitesimal quantities of reactants during this very short but finite time is not observable. Since the observation cell is of a finite length (and volume), at the instant of flow stoppage, the dead time for the frontal plane of the slug of mixed reactants is longer than the dead time for the trailing plane of the same slug. Consequently at any given instant or at the time of stoppage, since the reaction at the outlet of the cell 17 is further along than that at the inlet thereof, the reaction detected is some average for the total change within the observation chamber. This, however, is an optical average rather than a volumetric average. For all practical purposes, however, the effective dead time for the entire slug of mixed reactants in the cell 17 after stoppage could be defined as approximately the mean between the dead time at one end of the slug and the dead time at the other end, and consequently is denominated "mean dead time."

Since the period of the sine wave signal derived from the transducer 30 is directly related to the distance between two adjacent ridges 31 on the piston arm 19 of the stopping cylinder 18, that period is directly related to the displacement of the stopping cylinder piston, and therefore directly related to the volume of reactants used as well as the flow rate of reactants through the mixer 16. By careful measurement of the volume of mixed reactants in the module between the outlet of the mixer 16 and the inlet of the cell 17, as well as the total volume of the cell 17, it is possible to determine mean dead time from the flow rate determined from the period of the sine wave signal derived from the transducer 30. Mixing time may be indirectly determined by using different reactants of very short known reaction times in successive runs, a shorter reaction time for each run until no reaction is discernible. The mixing time is then known to be equal to or less than the mean dead time. For greater accuracy in determining mixing time, it is only necessary, for example, to determine the time it would take to fill the module from the outlet of the mixer to the inlet of the cell 17. It would then be correct to state that the mixing time is equal to or less than that time instead of simply less than the mean dead time.

In operation, investigation of the kinetics of a chemical reaction is accomplished by simply actuating the cam 24 to open the valve 21. Substantially constant pressure provided by the hydropneumatic drive system then causes reactants from the driving cylinders 14 and 15 to pass through the mixer 16 and the observation cell 17 into the stopping cylinder 18 until the piston arm thereof reaches the preset stop 20. At that instant, flow of the mixed reactants stops in the cell 17 and the oscilloscope 27 is triggered to synchronize the sweep thereof. The change in transmittance or optical density displayed on the oscilloscope may then be photographed on recording film or recorded on other media.

In the usual investigation, the half life of the reactants is about 70 milliseconds while the mixing time is one millisecond or less. The very small change in optical density due to reaction which takes place during this mixing time may be estimated, if desired, by extrapolation back from the instant the sweep of the oscilloscope is triggered. Since the stopped flow module and drive system remains under substantially constant pressure from before the instant the valve 21 is opened until it is again closed for another kinetic determination, back pressure waves are virtually eliminated, or substantially reduced to a very small order of magnitude, thereby virtually eliminating any transient motion of the mixed reactants in the observation cell once the stopping cylinder piston arm 19 reaches a preset stop 20 to stop flow through the observation cell 17. As noted hereinbefore, a further advantage of this invention is that due to the substantially elevated pressure within the system over and above the respective partial vapor pressures, degassing of the reactants is not necessary, nor is cavitation a problem.

Before initiating another chemical reaction for investigation, the system is reset by closing the valve 21, opening the valve 22, and repositioning the piston of the stopping cylinder 18. It may be readily appreciated that the position of that piston determines the quantity of reactants used in a given kinetic determination. Often, because of the nature of the reactants, it is desirable to use as little as possible. However, the piston of the stopping cylinder should be so set as to allow sufficient reactants to be driven through the mixer (at as high a velocity as possible and necessary) to fill the observation cell with a new mixture, and minimize the dead time before flow is stopped. In a commercial model of the present invention, the stopping cylinder piston is normally set for a consumption rate of 100 microliters of each reactant for each chemical reaction. On the other hand, the reactant driving cylinders 14 and 15 were designed to provide 3000 microliters of reactants in order that as many as 30 chemical reactions may be investigated in rapid succession. Once the piston of the stopping cylinder 18 has been reset, the drain valve 22 is closed and the cam 24 is reactuated to again open the valve 21. In this manner rapid investigations of chemical reactions with high repeatability at a rate of from 6 to 12 per minute are achieved, even with a manual system. The relatively high rate may be important when conducting investigations with unstable reactants. It should be noted that the system remains charged with fluid between the closed valve 21 and the piston of the stopping cylinder 18 after the latter is reset for the next run in order that pressure remain substantially constant in the cell 17 when the valve 21 is opened.

To adjust the reset position of the stopping cylinder piston relative to the stop 20, a sleeve 33 is threaded into a support member 34. For maximum volume of reactants used per run, the sleeve is adjusted to the position shown (with its upper end even with or below the upper surface of the support member 33). For smaller volumes of reactants used per run, the sleeve 33 is turned until the desired amount of it protrudes above the support member 33, thereby shortening the stroke of the stopping cylinder 19. Regardless of where the sleeve 33 is positioned, the stopping cylinder is reset by simply pushing the stop 20 upwardly through a rod 35 passing through a smooth bore in the sleeve 33. The rod 35 is sufficiently long to permit the piston arm 19 to be moved into the cylinder 18 to a predetermined position regardless of the position of the sleeve 33. The stop 20 is then pulled back to its operative position against the sleeve 33. A knurled knob 36 is provided for that purpose.

To recharge the reactant drive cylinders, the three-way valves 12 and 13 are repositioned to connect the storage cylinders 10 and 11 to the sample driving cylinders 14 and 15 after pressure in the power cylinder 23 has been relieved. These storage cylinders 10 and 11 may be standard luer-type hypodermic syringes. As pressure is applied to the pistons or plungers of the storage cylinders or syringes, reactant is transferred therefrom to the driving cylinders 14 and 15. In so doing, the piston of the hydraulic power cylinder 23 drives hydraulic fluid back into an accumulator 40. The latter is provided with a large space (as compared to the total volume of the hydraulic power cylinder 23) that is charged with air or nitrogen to a suitable pressure (after the drive cylinders 14 and 15 have been recharged and the valves 12 and 13 have been returned to the position shown), such as 320 p.s.i.g. for a chemical reaction investigation under approximately 250 p.s.i.g., the difference in pressure being a result of the difference in the effective hydraulic areas of the driving and the power cylinders. The smallest feasible power cylinder has been chosen to minimize the volume of hydraulic fluid required and the inertia of the piston, thus minimizing the acceleration time and the volume of reactant required.

A gauge 41 may be provided to guard against overcharging the accumulator through a line 42 connected thereto by a check valve 43. Assuming no hydraulic fluid leaks past the piston of the hydraulic power cylinder 23, or otherwise once the accumulator 40 is charged to 320 p.s.i.g., it will remain charged within a few p.s.i. through as many as 30 or more cycles of the stopped flow module and drive system. A return line 44 to a hydraulic reservoir 45 is provided to collect any hydraulic fluid that may leak past the hydraulic power cylinder piston.

To recharge the hydropneumatic drive system with hydraulic fluid, a pump 46 is energized either manually, electrically or otherwise to transfer hydraulic fluid under pressure from the hydraulic reservoir 45 through check valves 47 and 48. A safety relief valve 49 connects the output of the check valve 48 to the return line 44 to prevent overcharging the hydropneumatic drive system. A manual relief valve 50 is also provided in a separate line 51 to return hydraulic fluid to the hydraulic reservoir 45 such as when the drive system is to be discharged of all pressure, upon securing the apparatus for an extended period of non-use. An elastomeric bag, shown schematically as a floating piston 52 in the accumulator shields the hydraulic fluid outlet and prevents the loss of the gas charge when the manual relief valve is opened to drain hydraulic fluid therefrom into the reservoir 45. The manual relief valve 50 is also used to reduce hydraulic pressure on the reactant drive cylinders 14 and 15 while they are being reloaded from the storage cylinders 10 and 11 via three-way valves 12 and 13. Once the three-way valves 12 and 13 are returned to the position shown, the manual relief valve 50 may then be closed and the drive system pressurized with the pump 46. When the desired pressure has been achieved in the drive system, the fluid in the stopped flow system will remain static so long as the valve 21 is not opened. Actuation of the cam 24 opens the valve 21, as noted hereinbefore, causing reactants to flow at substantially constant pressure and high speed from the driving cylinders 14 and 15 into the mixer 16, thence through the observation cell 17 and into the stopping cylinder 18 until the piston arm 19 hits the preset stop 20, at which instant a stopped flow or static condition is achieved. In that manner the human factor present in prior art systems is eliminated, thus providing a system for investigating chemical reactions with high repeatability.

Elimination of gas bubbles within the stopped flow module is another important feature of the present invention. As noted hereinbefore, prior art systems require that the reactants be degassed in order to prevent them from out gassing during an investigation. Still another advantageous feature of this invention is that high fluid velocities are achieved in much shorter time than in prior art systems which start with the reactants at atmospheric pressure. This is important because of the need for quickly filling the flow cell with mixed reactants in order to start monitoring the chemical reaction in less than one millisecond, and preferably in less than .5 millisecond which can be readily achieved by the present invention.

Although the present invention has been shown and described with reference to a particular embodiment, it should be apparent to one skilled in the art that many changes and modifications may be made without depart-

What is claimed is:

1. Apparatus, for rapidly filling an observation cell with liquid reactants which have just been rapidly mixed, including a plurality of hydraulic reactant drive cylinders for driving quantities of said reactants from outlet ports thereof to inlet ports of a mixer, an outlet port of said mixer having a passage in communication with an inlet port of said observation cell, and an outlet port of said observation cell having a passage in communication with a hydraulic stopping cylinder, said stopping cylinder having associated therewith means for allowing a predetermined volume of mixed reactants to flow through said cell and for instantaneously stopping further flow, the improvement comprising:

a valve normally closing the passage between the outlet port of said cell and the stopping cylinder, first means coupled to the drive cylinders for applying a constant pressure to the driving pistons of said drive cylinders to displace the reactants therefrom and for continuously maintaining the stopped flow apparatus to said valve under said constant pressure at all times and, second means for selectively opening said valve, thereby allowing mixed reactants to flow therethrough to said stopping cylinder.

2. In a stopped flow apparatus, the combination as defined in claim 1 including means for measuring flow rate of mixed reactants into said stopping cylinder.

3. In a stopped flow apparatus, the combination as defined in claim 1 wherein said first means comprises:

a hydraulic power cylinder having its piston connected to pistons of said drive cylinders, an accumulator for storing a hydraulic fluid under pressure and thus energy, said accumulator having an outlet port in communication with the chamber of said power cylinder, and third means for maintaining fluid transfer pressure from said accumulator to said hydraulic power cylinder substantially constant.

4. In a stopped flow apparatus, the combination as defined in claim 3 wherein said third means comprises a gas precharged into a space in said accumulator the volume of which is large relative to the total volume of the fully expanded power cylinder whereby pressure is maintained substantially constant in the apparatus as reactants are driven through said mixer once said second means is actuated to open said valve.

5. In a stopped flow apparatus, the combination as defined in claim 4 including means for resetting said stopping cylinder thereby resetting the apparatus for measuring another predetermined volume of mixed reactants flowing through said cell.

6. In a stopped flow apparatus, the combination as defined in claim 5 including means for recharging said reactant drive cylinders with reactants.

7. Apparatus as defined in claim 5 including uniformly spaced ridges of magnetic material on the piston arm of said stopping cylinder and a variable reluctance transducer so positioned adjacent thereto as to produce an alternating electrical signal in response to movement of said ridges as said piston arm moves, the period of said alternating signal being directly proportional to the rate at which reactants flow through said mixer.

References Cited

UNITED STATES PATENTS

| | | | |
|---|---|---|---|
| 3,030,192 | 4/1962 | Schneider | 250—218 X |
| 3,225,645 | 12/1965 | Baruch | 250—218 X |
| 3,422,271 | 1/1969 | Fuhrmann | 23—253 X |
| 3,437,447 | 4/1969 | Harmon | 23—253 |

OTHER REFERENCES

Q. H. Gibson et al., Biochem. Jour., 91, 161–171, (1964). C. A. 63:4629e, (1965).

MORRIS O. WOLK, Primary Examiner

SIDNEY MARANTZ, Assistant Examiner

U.S. Cl. X.R.

356—201